US008635758B2

(12) United States Patent
Slepecki et al.

(10) Patent No.: US 8,635,758 B2
(45) Date of Patent: Jan. 28, 2014

(54) METHOD OF AFFIXING A PLAQUE TO A SOLID SURFACE

(75) Inventors: Gregory A. Slepecki, Moon Township, PA (US); Daniel T. Lenau, Hookstown, PA (US)

(73) Assignee: Matthews Resources, Inc., Wilmington, DE (US)

( * ) Notice: Subject to any disclaimer, the term of this patent is extended or adjusted under 35 U.S.C. 154(b) by 927 days.

(21) Appl. No.: 12/622,463

(22) Filed: Nov. 20, 2009

(65) Prior Publication Data

US 2010/0122448 A1    May 20, 2010

Related U.S. Application Data

(60) Provisional application No. 61/116,376, filed on Nov. 20, 2008.

(51) Int. Cl.
*A01K 97/10*    (2006.01)
*F16B 35/02*    (2006.01)

(52) U.S. Cl.
USPC ....... 29/525.02; 29/525.11; 40/745; 434/378; 52/103; 428/913.3; 248/475.1; 248/489

(58) Field of Classification Search
USPC ............... 29/525.01, 525.02, 525.11; 40/745, 40/757, 124.5; 434/378; 52/103; 428/913.3; 248/475.1, 497, 489; 411/520, 521, 437
See application file for complete search history.

(56) References Cited

U.S. PATENT DOCUMENTS

| 1,500,870 | A | * | 7/1924 | Holdredge | 52/155 |
|---|---|---|---|---|---|
| 3,433,119 | A | * | 3/1969 | Ballantyne et al. | 411/437 |
| 3,964,680 | A | * | 6/1976 | Arthur | 238/366 |
| 4,828,444 | A | * | 5/1989 | Oshida | 411/437 |
| 5,542,777 | A | * | 8/1996 | Johnson | 403/389 |
| 6,070,836 | A | * | 6/2000 | Battie et al. | 248/68.1 |
| 6,974,290 | B2 | * | 12/2005 | Pountney | 411/384 |
| 7,004,702 | B2 | * | 2/2006 | Van Der Heijden | 411/438 |
| 7,036,203 | B2 | * | 5/2006 | Rudduck | 29/469 |
| 7,266,874 | B2 | * | 9/2007 | Ernst et al. | 29/432 |
| 7,934,690 | B1 | * | 5/2011 | Walter | 248/539 |

OTHER PUBLICATIONS

Tubular Clip Drawing No. C57851-010; Tinnerman Palnut Engineered Products, LLC; 1 page, Aug. 24, 1988.

* cited by examiner

*Primary Examiner* — David Bryant
*Assistant Examiner* — Jason L Vaughan
(74) *Attorney, Agent, or Firm* — Pepper Hamilton LLP

(57) ABSTRACT

A method and system of affixing a plaque to a solid surface is provided. The method includes the steps of providing at least one opening in a face of the solid surface and inserting a plaque support into the at least one opening. The plaque support includes a body defining a passageway therethrough and having a first end and a second end. The first end has a flange portion. Further, at least one outer tab member extends radially outward toward the first end and at least one inner tab member extends radially inward toward the second end. The outer tab member engages the solid surface upon insertion of the plaque support into the at least one opening. The method and system further include providing the plaque with at least one installation fastener. The at least one installation fastener is inserted into the passageway of the plaque support, such that the at least one inner tab member engages the at least one installation fastener.

12 Claims, 4 Drawing Sheets

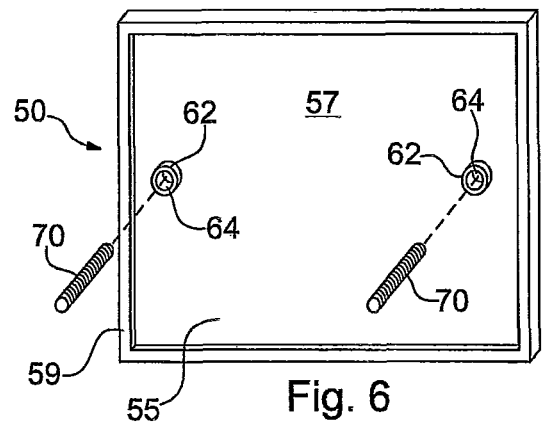
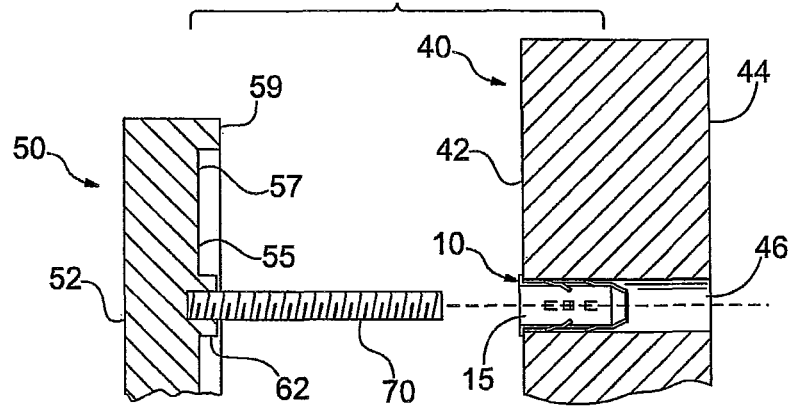

METHOD OF AFFIXING A PLAQUE TO A SOLID SURFACE

CROSS-REFERENCE TO RELATED APPLICATION

The present application claims priority from U.S. Provisional Patent Application No. 61/116,376, filed Nov. 20, 2008, which is incorporated herein by reference in its entirety.

BACKGROUND OF THE INVENTION

1. Field of the Invention

The present invention relates to a method for affixing a plaque to a solid surface and, more particularly, to a method for securing a bronze memorial plate to a granite shutter panel.

2. Description of Related Art

Plaques are commonly secured to the front of a mausoleum crypt, columbarium, or niche to memorialize a deceased person. For instance, a bronze memorial may be attached to the face of a granite shutter. Typically, the plaque or memorial includes two or more threaded studs that are inserted through bores drilled through the granite shutter. The threaded studs extend through the bore beyond the rear surface of the shutter. Washers are placed over the threaded studs and engage the rear surface of the shutter. Nuts are then typically threaded onto the threaded studs to engage the washers and secure the plaque to the face of the granite shutter.

SUMMARY OF THE INVENTION

In one embodiment, a method of affixing a plaque to a solid surface is provided. The method includes the steps of providing at least one opening in a face of the solid surface and inserting a plaque support into the at least one opening. The plaque support includes a body defining a passageway therethrough and having a first end and a second end. The first end has a flange portion. Further, at least one outer tab member extends radially outward toward the first end and at least one inner tab member extends radially inward toward the second end. The outer tab member engages the solid surface upon insertion of the plaque support into the at least one opening. The method further includes the steps of providing the plaque with at least one installation fastener and inserting the at least one installation fastener into the passageway of the plaque support such that the at least one inner tab member engages the at least one installation fastener.

The second end may have at least one lead tab extending radially inward. Further, the at least one lead tab may engage at least one installation fastener upon insertion of at least one installation fastener into the passageway of the plaque support. The flange portion of the plaque support may have an outer diameter larger than the diameter of the opening. The installation fastener may comprise a plurality of threads, such that, when it is inserted into the plaque support, at least one inner tab member engages at least one thread of the plurality of threads.

The opening in a face of the solid surface may be provided by drilling the opening. Additionally, the plaque support can be inserted into the opening by applying force to the first end of the plaque support. The plaque support may comprise steel or high carbon spring steel. Additionally, the flange portion of the plaque support may engage a face of the solid surface.

The installation fastener may be provided with the plaque by providing an opening on a mounting surface of the plaque, wherein the installation fastener is inserted into the opening.

In one embodiment, the installation fastener may comprise a plurality of threads, and the opening on the mounting surface of plaque may comprise a threaded opening, wherein the installation fastener is threadably secured to the opening.

In another embodiment, the mounting surface of the plaque may comprise a circumferential lip. The circumferential lip may surround a recessed area, which is defined by the mounting surface. Additionally, a boss may be provided on the recessed area having a threaded opening for threadably securing the installation fastener thereto.

In another embodiment, a system for affixing a plaque to a solid surface is provided. The plaque support includes a body defining a passageway therethrough and having a first end and a second end. The first end has a flange portion. Further, at least one outer tab member extends radially outward toward the first end and at least one inner tab member extends radially inward toward the second end. The outer tab member engages the solid surface upon insertion of the plaque support into the at least one opening. The system also includes a plaque and an installation fastener for inserting into the passageway of the plaque support. The installation fastener is secured to the plaque, and the inner tab member engages the installation fastener when the fastener is inserted into the passageway of the plaque support. The plaque may comprise a mounting surface comprising at least one opening, wherein the installation fastener is inserted into the opening. Additionally, the mounting surface may comprise a circumferential lip surrounding a recessed area, which is defined by the mounting surface. Additionally, the mounting surface may comprise a boss which defines a threaded opening, and an installation fastener comprising a plurality of threads that may be threadably secured to the threaded opening of the boss.

BRIEF DESCRIPTION OF THE DRAWINGS

FIG. 6 is a perspective view of a second step in the method of FIG. 4, showing a mounting surface of the plaque;

FIG. 7 is a cross-sectional view of a third step in the method of FIG. 4, showing the plaque being aligned with the solid surface;

BRIEF DESCRIPTION OF THE INVENTION

For purposes of the description hereinafter, spatial orientation terms, if used, shall relate to the referenced embodiment as it is oriented in the accompanying drawing figures or otherwise described in the following detailed description. However, it is to be understood that the embodiments described hereinafter may assume many alternative variations and embodiments. It is also to be understood that the specific devices and methods illustrated in the accompanying drawing figures and described herein are simply exemplary and should not be considered as limiting.

Figure 1:
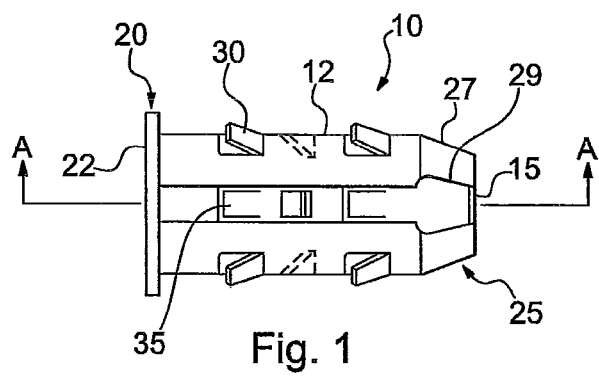
FIG. 1 is a side view of a plaque support according to one embodiment of the present invention.
Figure 2:
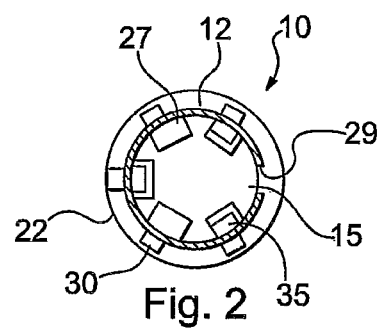
FIG. 2 is a front view of the plaque support shown in FIG. 1.
Figure 3:
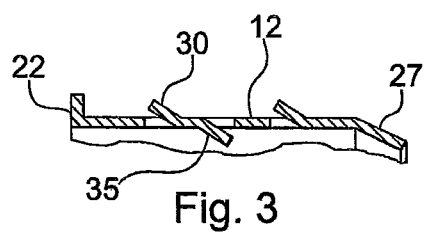
FIG. 3 is a cross-sectional view of the plaque support shown in FIG. 1 taken along the line A-A in FIG. 1.

Referring to FIGS. 1-3, a plaque support 10, for use in a method of affixing a plaque to a solid surface, includes a cylindrical body 12 defining a passageway 15 therethrough. The plaque support 10 has a first end 20 and a second end 25. A slot 29 extends longitudinally from the first end 20 to the second end 25. The first end 20 has a flange portion 22 extending from the cylindrical body 12 and the second end 25 has at least one lead tab 27 extending radially inward, i.e., toward the passageway 15. As shown in FIG. 2, the plaque support 10 includes five lead tabs 27 extending from the second end 25. The cylindrical body 12 also includes at least one outer tab member 30 extending radially outward toward the first end 20 and at least one inner tab member 35 extending radially inward toward the second end 25. As shown in FIG. 2, the plaque support 10 includes ten outer tabs 30 and three inner tabs 35. The plaque support 10 may be constructed of steel, in particular, high carbon spring steel. Any other suitable material, however, may be used for the plaque support 10.

Referring to FIGS. 4-9, one embodiment of a method for affixing a plaque to a solid surface is disclosed.

Figure 4:
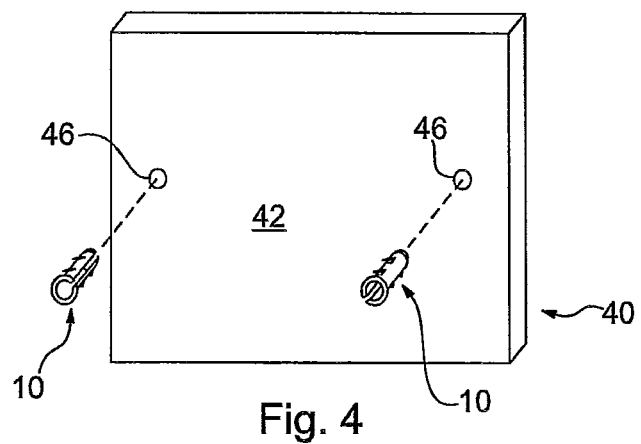
FIG. 4 is a perspective view of a first step in a method of affixing a plaque to a solid surface according to one embodiment of the present invention.
Figure 5:
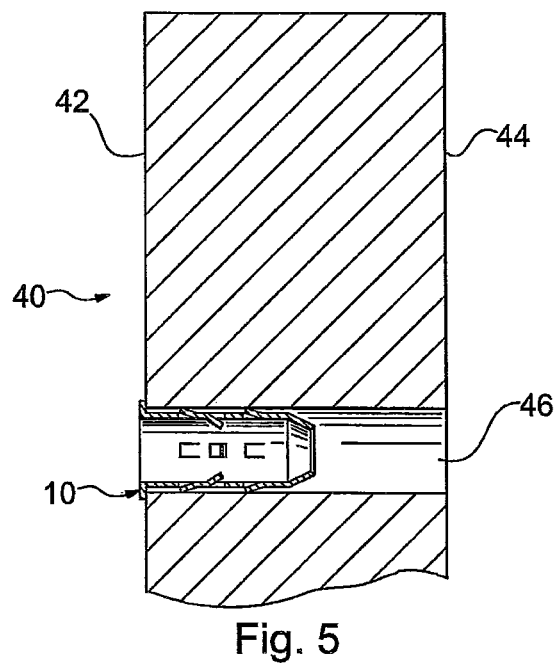
FIG. 5 is a cross-sectional view of the step of FIG. 4, showing the plaque support of FIG. 1 inserted into an opening of the solid surface.

As shown in FIG. 4, a solid surface 40 is provided having a first face 42 and a second face 44. The solid surface 40 has two openings 46 in the first face 42. In certain embodiments, the solid surface 40 is granite and the openings 46 are provided by drilling the first face 42 of the solid surface 40. Two plaque supports 10, as described above and shown in FIGS. 1-3, are inserted into each of the openings 46. Although the openings 46, as shown in FIG. 5, extend through the solid surface 40 from the first face 42 to the second face 44, the openings 46 may be provided, such that they only extend a portion of the way into the solid surface 40. During insertion of the plaque supports 10 into the openings 46, the outer tabs 30 of the plaque support 10 engage the portion of the solid surface 40 defining the opening 46. Because the outer tabs 30 extend radially outward toward the first end 20 of the plaque support 10, the outer tabs 30 allow movement in a forward direction, i.e., where the first end 20 is trailing, but substantially prevent movement in a rearward direction, i.e., where the second end 25 is trailing.

Further, due to the engagement of the outer tabs 30 with the solid surface 40, the insertion of the plaque supports 10 into the openings 46 may need to be assisted by using a rubber mallet (not shown) or other suitable tool. For example, a rubber mallet may be used to apply a force to the first end 20 of the plaque support 10, thereby forcing the plaque support 10 into the opening 46. The outer tabs 30 may be plastically or elastically deformed during insertion of the plaque support 10 into the opening 46. The flange portion 22 of the plaque support 10 has an outer diameter larger than the diameter of the opening 46, such that the flange portion 22 engages the first face 42 of the solid surface 40 to prevent the plaque support 10 from extending all of the way through the opening 46 during subsequent steps discussed below.

Referring to FIGS. 6 and 7, a plaque 50 is provided having a display surface 52 and a mounting surface 55. In certain embodiments, the plaque 50 is a bronze memorial having ornamentation or other display indicia on the display surface 52. The mounting surface 55 of the plaque 50 defines a recessed area 57 surrounded by a circumferential lip 59. The recessed area 57 includes two bosses 62 each having a threaded opening 64. As shown in FIG. 6, a pair of installation fasteners 70 is threadably secured to the threaded openings 64. The plaque 50 with the installation fasteners 70 is then positioned, as shown in FIG. 7, so that the installation fasteners 70 are aligned with the respective passageways 15 of the plaque supports 10.

Figure 8:
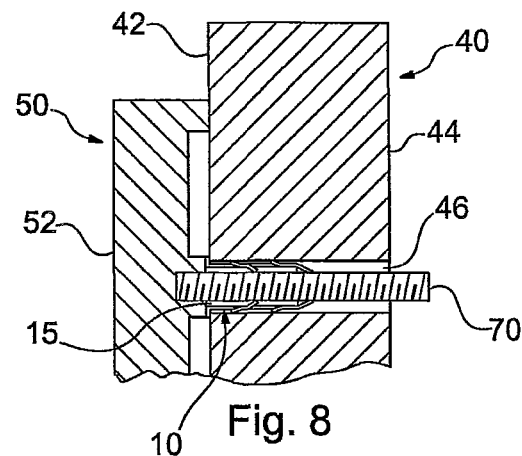
FIG. 8 is a cross-sectional view of a fourth step in the method of FIG. 4, showing the plaque secured to the solid surface.
Figure 9:
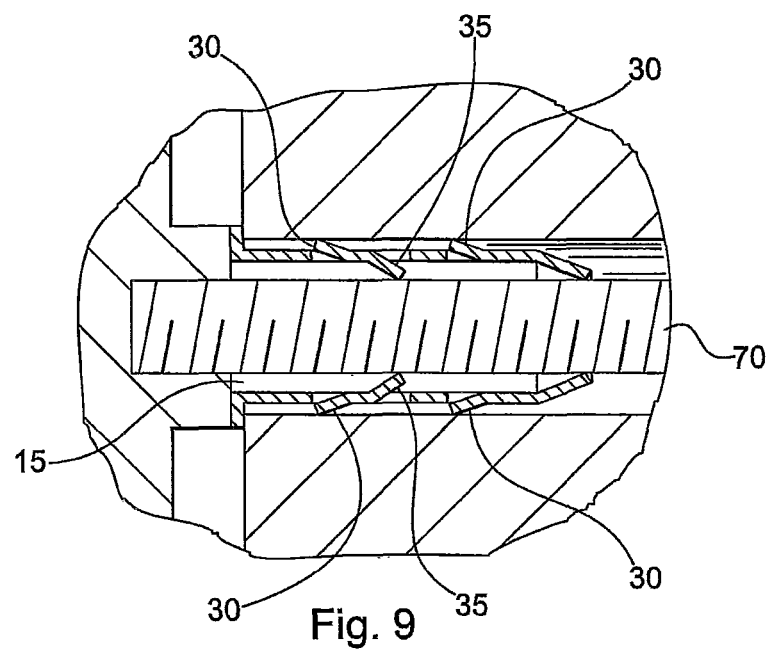
FIG. 9 is a detail view of the cross-section shown in FIG. 8.

Referring to FIGS. 8 and 9, the installation fasteners 70 secured to the plaque 50 are then inserted into the passageway 15 of the plaque support 10. After the installation fasteners 70 are completely inserted into the passageway 15, such that the bosses 62 engage the first end 20 of the plaque support 10, the circumferential lip 59 on the mounting surface 55 of the plaque 50 abuts the first surface 42 of the solid surface 40. As shown more clearly in FIG. 9, the inner tabs 35 and the lead tabs 27 of the plaque support 10 engage the installation fastener 70. In particular, the inner tabs 35 and the lead tabs 27 of the plaque support 10 engage the threads of the installation fastener 70. The inner tab member 35 and the lead tabs 27 extend radially inward away from the first end 20 of the plaque support 10, thereby allowing displacement of the installation fastener 70 in a forward direction, i.e., displacement from the first end 20 to the second end 25, but substantially preventing displacement of the installation fastener 70 in a rearward direction, i.e., displacement from the second end 25 to the first end 20. Accordingly, the plaque support 10 is secured within the opening 46 in the solid surface 40 via the outer tabs 30 through installation fasteners 70 and plaque 50 is secured through installation fasteners 70 to the plaque support 10 via the lead tabs 27 and the inner tabs 35. Therefore, the method, as described above, enables the plaque 50 to be affixed to the solid surface 40 in a simple and reliable manner without requiring access to a second or rear face 44 of the solid surface 40.

Although the method was shown in FIGS. 1-9 and described above using a particular number of plaque supports 10, openings 46, bosses 62, and installation fasteners 70, the method may employ one or more plaque supports 10 and a corresponding number of installation fasteners 70 secured to the plaque 50 to affix the plaque 50 to the solid surface 40. Furthermore, although the method was described with reference to securing bronze memorials to granite surfaces, the method may be used to secure any object to any solid surface. For example, the method may be used to affix architectural elements to a stone, brick, or other type of building surface.

While several embodiments of a method for affixing a plaque to a solid surface were described in the foregoing detailed description, those skilled in the art may make modifications and alterations to these embodiments without departing from the scope and spirit of the invention. Accordingly, the foregoing description is intended to be illustrative rather than restrictive.

The invention claimed is:

1. A method of affixing a plaque to a solid surface comprising the steps of:
   providing at least one opening in a face of the solid surface; the plaque including a front face and a rear face;
   inserting at least one plaque support into the at least one opening, the at least one plaque support comprising: a body defining a passageway therethrough and having a first end and a second end, the first end having a flange portion;
   at least one outer tab member extending radially outward from the body toward the first end; and
   at least one inner tab member extending radially inward from the body toward the second end, wherein the outer tab member is deformed to engage the solid surface when the plaque support is inserted into the at least one opening;
   providing the plaque with at least one installation fastener;

wherein the at least one installation fastener includes a front end and a rear end, the rear end being distal relative to the plaque and the front end being proximal relative to the plaque;

wherein the front end of the at least one installation fastener is located in the rear face of the plaque;

inserting the at least one installation fastener into the passageway of the plaque support such that the at least one installation fastener along with the plaque moves in a rearward direction that is defined as a direction wherein the rear face of the plaque moves toward the face of the solid surface;

moving the plaque and at least one installation fastener in the rearward direction until the plaque and at least one installation fastener is installed on the face of the solid surface and the at least one installation fastener engages and deforms the at least one inner tab member of the plaque support; and wherein after the plaque and the at least one installation fastener is installed on the face of the solid surface movement of the plaque and the at least one installation fastener in a forward direction that is a direction opposite the rearward direction is prevented by the at least one inner tab member engaging the at least one installation fastener.

2. The method of claim 1, wherein the second end has at least one lead tab extending radially inward from the body.

3. The method of claim 2, wherein the at least one lead tab engages the at least one installation fastener upon insertion of the at least one installation fastener into the passageway of the plaque support.

4. The method of claim 1, wherein the flange portion of the plaque support has an outer diameter larger than the diameter of the opening.

5. The method of claim 1, wherein the at least one installation fastener comprises a plurality of threads such that the at least one inner tab member engages at least one thread of said plurality of threads.

6. The method of claim 1, wherein the step of providing at least one opening in a face of the solid surface comprises drilling said at least one opening in the face of the solid surface.

7. The method of claim 1, wherein the step of inserting at least one plaque support into the at least one opening comprises applying a force to the first end of the at least one plaque support, wherein the at least one plaque support is inserted into the at least one opening as a result of the force.

8. The method of claim 1, wherein the step of providing the plaque with at least one installation fastener comprises providing at least one opening on a mounting surface of the plaque and inserting the at least one installation fastener into the at least one opening of the plaque.

9. The method of claim 8, wherein the at least one installation fastener comprises a plurality of threads and the at least one opening on the mounting surface of the plaque comprises a threaded opening, wherein the step of inserting the at least one installation fastener into the at least one opening of the plaque comprises threadably securing the at least one installation fastener to the at least one opening on the mounting surface of the plaque.

10. The method of claim 9, wherein the mounting surface of the plaque comprises a circumferential lip surrounding a recessed area defined by the mounting surface, wherein the step of providing at least one opening on the mounting surface of the plaque comprises providing at least one boss on said recessed area having a threaded opening.

11. The method of claim 1, wherein the at least one plaque support comprises a material selected from the group consisting of steel and high carbon spring steel.

12. The method of claim 1, wherein the at least one flange portion of the at least one plaque support engages the face of the solid surface.

* * * * *